Dec. 31, 1968

T. R. TETERS 3,418,943

AUTOMOBILE TURNTABLE

Filed Jan. 19, 1967

INVENTOR.
Tinie R. Teters
BY
John A. Hamilton
Attorney.

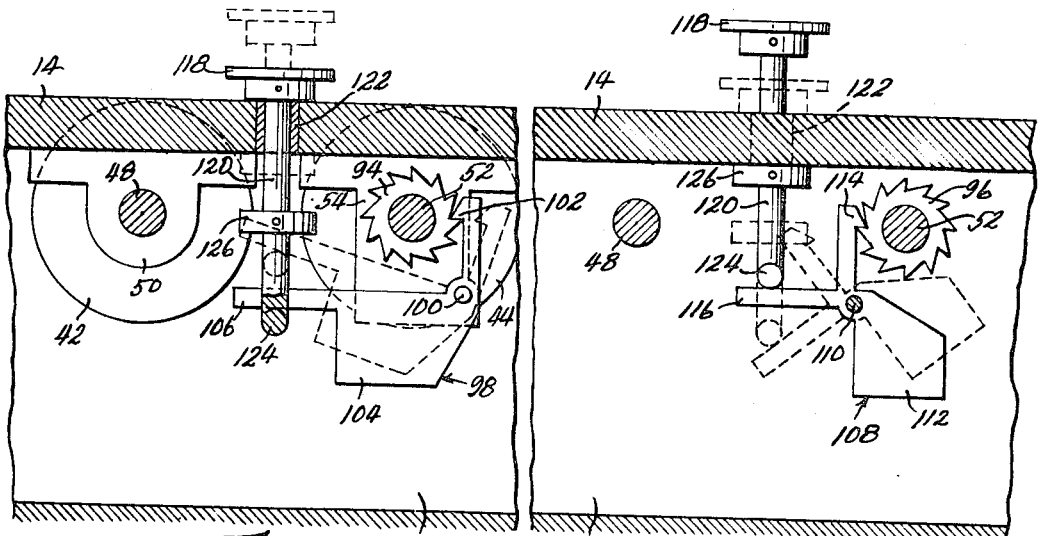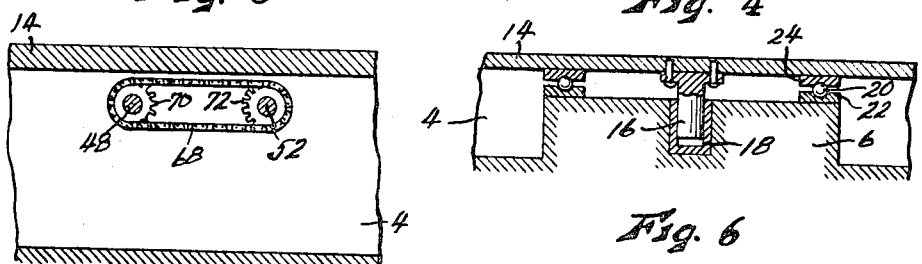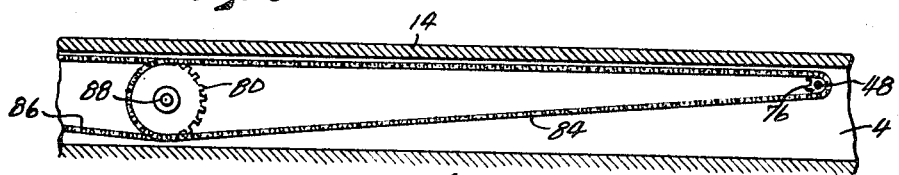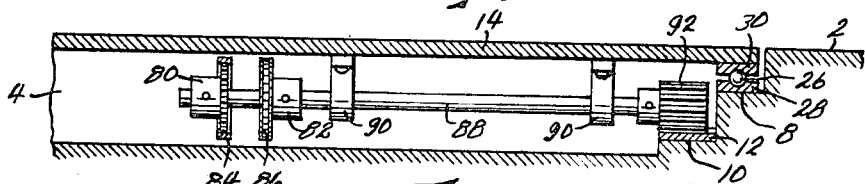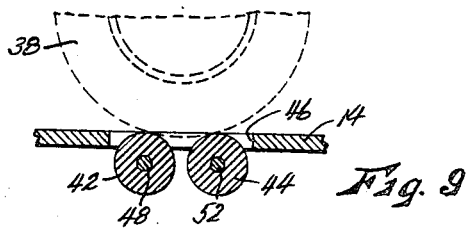

United States Patent Office 3,418,943
Patented Dec. 31, 1968

3,418,943
AUTOMOBILE TURNTABLE
Tinie R. Teters, 201 S. Cleveland Ave.,
Fayette, Mo. 65248
Filed Jan. 19, 1967, Ser. No. 610,389
1 Claim. (Cl. 104—44)

ABSTRACT OF THE DISCLOSURE

This application discloses a turntable onto which an automobile may be driven, and which may then be rotated as desired so that the automobile may be turned to any desired new heading, and is useful particularly in locations where it is desirable to turn an automobile and there is not sufficient ground area to accomplish the maneuver in the normal way. Special features of the present turntable are that it is powered entirely by the engine of the automobile itself, that its drive is reversible to permit the approach of an automobile thereto from either of two diametrically opposite directions, and that it is adaptable for use with either front wheel drive or rear wheel drive automobiles.

---

This invention relates to new and useful improvements in turntables, and relates particularly to a turntable onto which an automobile may be driven, and which may then be rotated to head the automobile in any desired different direction, the automobile thereby turning on its own vertical axis and requiring very little ground space for the maneuver, and from which the automobile may then be driven. Such turntables are highly desirable in driveways opening into busy streets, so that drivers using the driveway need never back into busy traffic lanes, in automotive service garages or the like where maneuvering space for moving automobiles about is often severely restricted, and in other locations.

An important object of the present invention is the provision of a turntable of the character described which is turned entirely by the power of the automobile itself.

Generally, this object is accomplished by the provision of a rotatable turntable carrying therein horizontal treadmill rollers on which the traction wheels of the automobile may be positioned so that said traction wheels may be turned by the automobile engine to drive the rollers without moving the automobile, and having means operable by rotation of said rollers to turn the turntable. Preferably, said rollers have rotation control means whereby rotation thereof in a direction corresponding to forward movement of the vehicle is prevented, so that the vehicle can be driven onto and off of said rollers in a forward direction, but can rotate in a direction corresponding to rearward travel of the vehicle so that the turntable can be rotated by operation of the automobile engine in reverse gear. Two sets of said treadmill rollers, disposed respectively at opposite sides of the turntable, may be provided so as to adapt it for use with automobiles having either front or rear wheel drives. Means may also be provided for reversing the rotation control means of the rollers, so as to permit the approach of an automobile from either direction, relative to the turntable itself.

Other objects are simplicity and economy of construction, efficiency and dependability of operation, and adaptability for use in a wide variety of applications.

Figure 1:
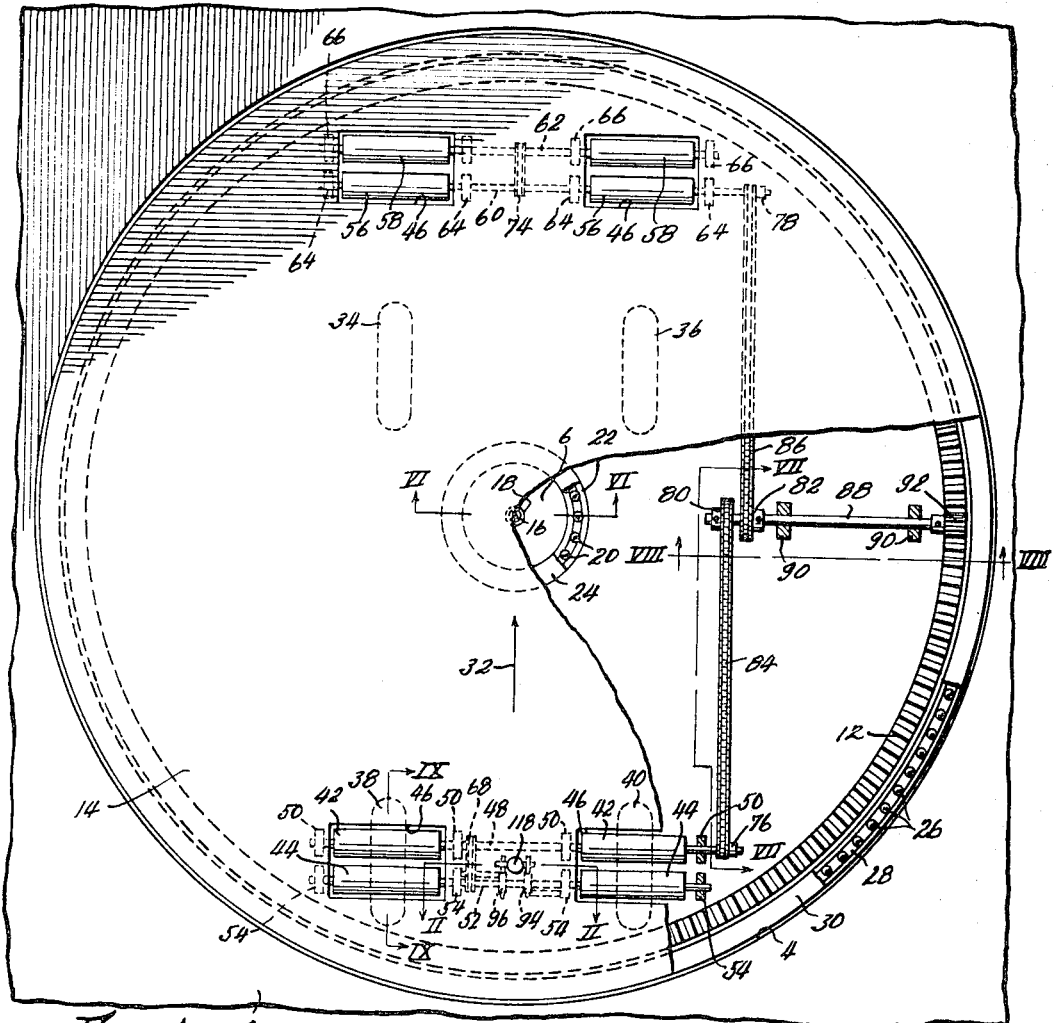
Figure 2:
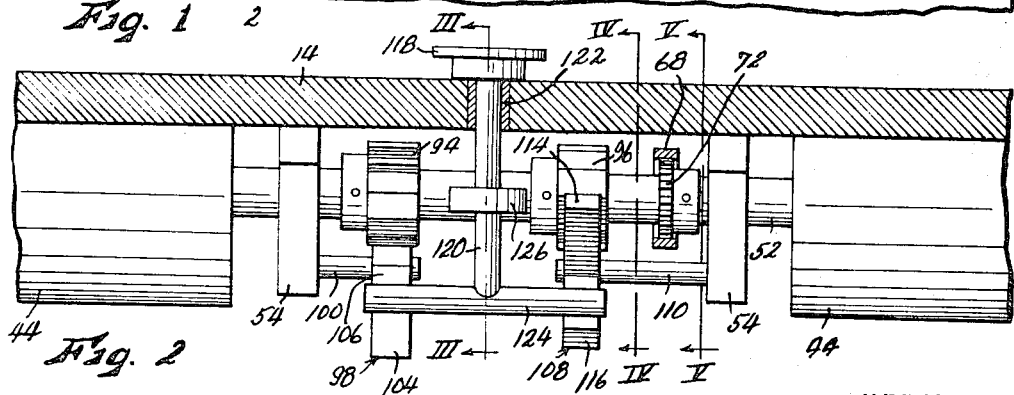

With these objects in view, as well as other objects which will appear in the course of the specification, reference will be had to the accompanying drawing, wherein:

FIG. 1 is a top plan view of an automobile turntable embodying the present invention, with parts broken away, FIG. 2 is an enlarged, fragmentary sectional view taken on line II—II of FIG. 1, FIG. 3 is an enlarged, fragmentary sectional view taken on line III—III of FIG. 2, FIG. 4 is an enlarged, fragmentary sectional view taken on Line IV—IV of FIG. 2, FIG. 5 is a reduced fragmentary sectional view taken on line V—V of FIG. 2, FIG. 6 is an enlarged, fragmentary sectional view taken on line VI—VI of FIG. 1, FIG. 7 is an enlarged, fragmentary sectional view taken on line VII—VII of FIG. 1, FIG. 8 is an enlarged, fragmentary sectional view taken on line VIII—VIII of FIG. 1, and FIG. 9 is an enlarged, fragmentary sectional view taken on line IX—IX of FIG. 1.

Like reference numerals apply to similar parts throughout the several views, and the numeral 2 applies to a roadway or driveway surface in which is formed a circular, depressed well 4. The driveway and well may be formed of concrete or other suitable material. Said well is formed with a central post 6 having a height less than the depth of the well, and with an upper horizontal step 8 and a lower horizontal step 10 formed around the periphery thereof intermediate surface 2 and the well bottom. A ring gear 12 having upwardly projecting teeth is fixed peripherally to the well on step 10.

A circular turntable platform 14 of flat, disc-like form is disposed concentrically in well 4 so that its upper surface is flush with driveway surface 2, and is of only slightly smaller diameter than said well. Said turntable has affixed to its lower surface a downwardly extending vertical stub axle 16 engaged rotatably in a bearing cup 18 affixed centrally in post 6, as best shown in FIG. 6, whereby said platform may be rotated. The weight of the turntable, and of the automobile to be supported thereby, is supported on central post 6 by a bearing including a series of steel balls 20 having rolling engagement between a lower race 22 fixed on post 6 and an upper race 24 fixed on the lower surface of turntable 14, as shown in FIGS. 1 and 6. The turntable is supported at its periphery by a bearing including a series of steel balls 26 having rolling engagement between a lower race 28 affixed on step 8 and an upper race 30 fixed to the lower surface of the turntable, as shown in FIGS. 1 and 8. The turntable is of such diameter that an automobile may be driven thereon, for example in the direction of arrow 32 in FIG. 1, the position of the front vehicle wheels then being indicated at 34 and 36, and the rear wheels at 38 and 40.

Positioned adjacent one edge of the turntable, so as to be disposed beneath each of the rear wheels of the vehicle when said vehicle is driven onto the turntable as presently described, are a pair of treadmill rollers 42 and 44. Said rollers extend horizontally and transversely to the line of travel of the car, and each pair of rollers is mounted in a window 46 formed in the turntable so as to extend substantially flush with the upper surface of said turntable, so that each pair of rollers can support a rear wheel of the automobile as shown in FIG. 9. Rollers 42 of both pairs are fixed on a common axle 48 supported beneath the turntable by bearings 50 affixed to the turntable. Similarly, rollers 44 of both pairs are fixed on a common axle 52 supported beneath the turntable by bearings 54 affixed to the turntable. Similarly, two pairs of treadmill rollers 56 and 58 are mounted in windows 46 of turntable 14 at the side thereof diametrically opposite from rollers 42 and 44, so as to be parallel with the latter, rollers 56 and 58 being similarly supported by axles 60 and 62 respectively, said axles having bearings 64 and 65 respectively. For reasons which will presently appear, it is preferred that the spacing between the rollers at the opposite sides of the turntable be greater than the greatest wheelbase length of an automobile likely to be encountered, so that if either the front or rear wheels of the automobile engage one set of rollers, the other vehicle wheels will not be in engagement with the other set of rollers. This is indicated in FIG. 1, wherein the front car wheels 34 and 36 do not engage rollers 56 and 58. Actually, each of the roller pairs 42—42, 44—44, 56—56 and 58—58, being fixed rigidly to a common axle, constitute a single roller and may be so referred to, though each said composite roller has been divided into sections to provide better bearing support. The length and spacing between the sections of each roller is such as to accommodate automobiles of virtually any tread width. Shafts 48 and 52 are interconnected, so as to be rotatable only in the same direction, by a sprocket chain 68 (see FIG. 5) trained around sprocket wheels 70 and 72 fixed respectively on said shafts. Similarly, shafts 60 and 62 of rollers 56 and 58 are interconnected by means of sprocket chain 74.

Shafts 48 and 60 are axially extended at corresponding ends thereof, and have sprocket wheels 76 and 78 fixed respectively thereon. Said sprocket wheels are interconnected respectively with sprocket wheels 80 and 82 by sprocket chains 84 and 86, sprockets 80 and 82 being both fixed on a shaft 88 extending horizontally beneath the turntable, and radially thereto, and being journalled in bearings 90 fixed to the bottom of the turntable. Fixed on said shaft is a pinion 92 meshed with ring gear 12. Thus it will be seen that rotation of either roller pair 42-44 or roller pair 56-58 will actuate pinion 92 to rotate the turntable about axle 16. Also, it will be seen that all four of the rollers 42, 44, 56 and 58 are so interconnected by chains 68, 74, 84 and 86 that all must rotate in the same direction if at all.

One of the roller shafts (shaft 52 as shown) is provided with rotation control means whereby to allow rotation thereof selectively in either direction, but to prevent reverse rotation. As best shown in FIGS. 2, 3 and 4, a pair of ratchet wheels 94 and 96 are fixed on said shaft, the two ratchets being identical except that the teeth thereof are relatively oppositely inclined. Ratchet 94 is provided with a dog 98 pivoted on a pin 100 fixed to the adjacent bearing 54, said dog having a tooth 102 operable to engage ratchet 94 to prevent counterclockwise rotation thereof (as viewed in FIG. 3), but to permit clockwise rotation. Said dog is counterweighted as at 104 to bias it yieldably toward its operative position with tooth 102 engaging the ratchet wheel, as shown in solid lines in FIG. 3, but is provided with a projecting arm 106 the elevation of which will render the dog inoperative by moving tooth 102 out of engagement with the wheel, as shown in dotted lines in FIG. 3. Similarly, ratchet wheel 96 is provided with a dog 108 pivoted on a pin 110 fixed to one of bearings 54 and having a counterweight 112 biasing the tooth 114 thereof yieldably into engagement with ratchet wheel 98, as shown in solid lines in FIG. 4, whereby to secure shaft 52 against clockwise rotation as viewed in FIG. 4, but to permit counterclockwise rotation. Dog 108 is provided with a projecting arm 116 the lowering of which will pivot said dog to an inoperative position with its tooth 114 disengaged from the ratchet, as shown in dotted lines in FIG. 4. The ratchets and dogs could be installed on any of the roller shafts, since as previously described, all of said shafts are interconnected so that all must rotate together, and locking one against rotation will lock them all.

Dogs 98 and 108 are controlled by means of a handle 118 disposed above turntable 14, said handle being affixed to the upper end of a vertical rod 120 carried for frictional sliding movement in a sleeve 122 fixed in said turntable. Said rod extends below the turntable into well 4, and has a horizontal crossbar 124 affixed to the lower end thereof. Said crossbar extends below arm 106 of ratchet dog 98, and above arm 116 of ratchet dog 108. Downward movement of rod 120 is limited by engagement of handle 118 with the upper surface of the turntable, and upward movement thereof is limited by engagement of a collar 126, fixed thereon below the turntable, with the lower surface of the turntable. Thus when handle 118 is lowered as shown in solid lines in FIG. 3 and dotted lines as shown in FIG. 4, dog 98 is rendered operative to permit clockwise rotation of roller shaft 52, as viewed in FIGS. 3 and 4, and hence of all of the roller shafts, but to prevent counterclockwise rotation, while dog 108 is rendered inoperative. If handle 118 is raised, as shown in solid lines in FIG. 4 and dotted lines in FIG. 3, dog 108 is rendered operative to permit counterclockwise rotation of the roller shafts, but to prevent clockwise rotation. Rod 120 is engaged in sleeve 122 with sufficient friction to prevent accidental or gravity-induced movement thereof. The forces exerted by the ratchet wheels themselves on the dogs are in all cases substantially radial to the dog pivots, and hence impose very little if any load on the dog arms 106 or 116, or on crossbar 124.

In operation, handle 118 is first manually set to lock all of rollers 42, 44, 56 and 58 against rotation in a direction corresponding to forward movement of the automobile, as determined by the direction from which the automobile is approaching. For example, if the automobile approaches in the direction of arrow 32 in FIG. 1, handle 118 is raised as in FIG. 4 to actuate ratchet dog 108 and deactivate dog 98, so that the rollers can turn in a counterclockwise direction, which corresponds to rearward travel of the automobile, but are locked against clockwise rotation, which corresponds to forward travel. If the automobile is approaching in a direction opposite to arrow 32, handle 118 is lowered as in FIG. 3 to deactivate dog 108 and activate dog 98, whereby the directions of rotation and non-rotation of the rollers are reversed. The automobile is then driven onto the turntable so that its traction wheels, whether these be the front or the rear wheels, are positioned on one set of the treadmill rollers. For example, if the automobile approaches in the direction of arrow 32 and has a rear wheel drive, the rear wheels 38 and 40 are positioned on rollers 42 and 44 as shown in FIGS. 1 and 9. If the automobile has a front wheel drive, the car is driven still farther forwardly until front wheels 34 and 36 are positioned on rollers 56 and 58. There can be no difficulty in moving the automobile traction wheels, whether they be the front or the rear wheels, onto the appropriate rollers due to free rotation of said rollers, and there could be none even if the rollers projected above the turntable surface, since rotation of said rollers in the direction they are urged by rotation of said traction wheels to drive the car forwardly is prevented by dog 98 or dog 108. When the car is thus positioned, the gear shift thereof is set to turn said traction wheels in a direction tending to move the car rearwardly. The car of course does not move rearwardly, since the treadmill rollers then in use rotate freely in the direction not inhibited by dogs 98 or 108. The consequent rotation of the treadmill rollers acts through sprocket 76 or 78, chain 84 or 86, sprocket 80 or 82, shaft 88, pinion 92 and ring gear 12 to rotate the turntable. When the angular position of the turntable providing the desired new heading of the automobile is reached, the automobile gears are shifted into neutral to stop the turntable movement. The turntable can also be "braked" to a stop by applying the vehicle brakes. The automobile may then be driven forwardly off of the turntable in the new direction. Dog 98 or 108 again locks the rollers against rotation, so that exit of the automobile is not prevented by free rotation of said rollers.

The fact that both pairs of rollers will rotate regardless of which pair thereof is actually being driven by the automobile traction wheels is the reason that the pairs of rollers are spaced apart by a distance greater than the longest automobile wheelbase dimension likely to be encountered. Otherwise, due to varying wheelbase lengths, the non-driven wheels of the automobile might rest partially on the platform and partially on the set of rollers not then being utilized and thus inhibit rotation thereof, which would in turn inhibit rotation of the rollers engaged by the driven or traction wheels of the automobile.

Accidental rearward movement of the vehicle off of the rollers during rotation of the turntable, which might otherwise occur due to the resistance to rotation of said rollers imposed by the work load of turning the turntable, is prevented by the mechanical advantage of the driving sprockets and chains, and by the nearly frictionless mounting of the turntable on ball bearings 20 and 26, so that very little engine power is required to turn the turntable. Also, the rollers of each pair could be set farther apart to allow the vehicle wheels to settle deeper therebetween, so that greater power would be required to move the vehicle off of said rollers. Also, it is most important, from a safety standpoint, that the turntable operation is at all times fully controlled by the driver of the automobile.

It is necessary that the two sections of each roller be rigidly connected together, as by their common shaft, so as to rotate as a unit. If they were not, but could rotate independently, then the car traction wheel resting on roller sections not connected to the turntable drive could be caused to rotate while the other traction wheel did not, as permitted by the differential gearing of the automobile, so that the turntable would not be rotated.

While I have shown and described a specific embodiment of my invention, it will be readily apparent that many minor changes of structure and operation could be made without departing from the spirit of the invention as defined by the scope of the appended claim.

What I claim as new and desire to protect by Letters Patent is:

1. An automobile turntable device adapted to be mounted in a circular well in a driveway surface and comprising:
   (a) a turntable platform mounted in said well for rotation about a vertical axis and with its upper surface generally flush with said driveway surface, whereby an automobile may be driven thereon,
   (b) a first pair of spaced apart parallel treadmill rollers mounted in said platform for rotation on horizontal axes and being positioned to support the driven traction wheels of said automobile therebetween, being disposed at one side of the axis of rotation of said platform and extending at right angles to a radius line from said axis and bisecting said rollers,
   (c) a second pair of treadmill rollers similar and parallel to said first pair, but carried by said platform at a position diametrically opposite from said first pair,
   (d) means carried by said platform and operable by rotation of either of said pairs of rollers to rotate said platform,
   (e) means interconnecting all of said rollers whereby all must rotate in the same direction, and
   (f) rotation control means carried by said platform and operable to permit rotation of all of said rollers selectively in either direction and in each case to secure said rollers against rotation in the opposite direction, said rotation control means comprising a pair of latch means associated with any one of said rollers and operable when in an operative position to permit rotation of said rollers in respectively opposite directions and to prevent rotation of said rollers in the opposite direction, a single control handle carried by said turntable platform for movement between two positions, and means operable by movement of said handle to one of its positions to render the first of said latch means operative and the second inoperative, and by movement of said handle to the other of its positions to render the first of said latch means inoperative and the second operative.

References Cited
UNITED STATES PATENTS

| | | | |
|---|---|---|---|
| 1,112,673 | 10/1914 | Brown et al. | 104—41 |
| 1,446,498 | 2/1923 | Freshwater | 104—41 |
| 1,772,075 | 8/1930 | Exon | 104—41 |
| 3,170,411 | 2/1965 | Howard | 104—40 |

ARTHUR L. LA POINT, *Primary Examiner.*

D. F. WORTH, *Assistant Examiner.*

U.S. Cl. X.R.

104—45